(12) United States Patent
Robinson et al.

(10) Patent No.: US 9,182,283 B2
(45) Date of Patent: Nov. 10, 2015

(54) IMAGING SPECTROPOLARIMETER USING ORTHOGONAL POLARIZATION PAIRS

(71) Applicant: RAYTHEON COMPANY, Waltham, MA (US)

(72) Inventors: Ian S. Robinson, Redondo Beach, CA (US); John D. Bloomer, Redondo Beach, CA (US)

(73) Assignee: RAYTHEON COMPANY, Waltham, MA (US)

( * ) Notice: Subject to any disclaimer, the term of this patent is extended or adjusted under 35 U.S.C. 154(b) by 49 days.

(21) Appl. No.: 14/244,251

(22) Filed: Apr. 3, 2014

(65) Prior Publication Data

US 2015/0285684 A1 Oct. 8, 2015

(51) Int. Cl.
*G01J 3/45* (2006.01)
*G01J 3/28* (2006.01)
*G01J 3/453* (2006.01)
*G01J 3/02* (2006.01)
*G01J 3/12* (2006.01)

(52) U.S. Cl.
CPC ............ *G01J 3/2823* (2013.01); *G01J 3/0224* (2013.01); *G01J 3/4531* (2013.01); *G01J 2003/1291* (2013.01)

(58) Field of Classification Search
CPC ......... G01J 3/02; G01J 3/0224; G01J 3/2823; G01J 3/447; G01B 9/02044; G01B 9/02084
USPC .......................................... 356/451, 453, 456
See application file for complete search history.

(56) References Cited

U.S. PATENT DOCUMENTS

| | | | |
|---|---|---|---|
| 5,045,701 A | 9/1991 | Goldstein et al. | |
| 7,016,040 B2 | 3/2006 | Chen et al. | |
| 2012/0008133 A1 | 1/2012 | Silny et al. | |
| 2012/0268745 A1* | 10/2012 | Kudenov | 356/453 |
| 2014/0198315 A1* | 7/2014 | Priore et al. | 356/364 |

OTHER PUBLICATIONS

Zhang, Chunmin et al., "Fourier Transform Hyperspectral Imaging Polarimeter for Remote Sensing," Optical Engineering 50(6), Jun. 2011, 6 pages.
Vandervlugt, Corrie et al., "Ground Vehicle Spectral and Polarization Imaging Sensor", College of Optical Sceinces.
Tyo et al: "Review of Passive Imaging Polarimetry for Remote Sensing Applications", Applied Optics, Optical Society of America, Washington, DC; US, vol. 45, No. 22, Aug. 1, 2006, pp. 5453-5469.
Tyo et al.,"Imaging Spectropolarimeters for Use in Visible and Infrared Remote Sensing", SPIE Conference on Imaging Spectrometry, vol. 3753, Oct. 27, 1999, pp. 214-224.

* cited by examiner

*Primary Examiner* — Jonathan Hansen
(74) *Attorney, Agent, or Firm* — Lando & Anastasi, LLP

(57) ABSTRACT

An imaging interferometric transform spectropolarimeter configured to simultaneously collect four polarizations. In one example, an spectropolarimeter includes a dual-beam interferometric transform spectrometer configured to receive electromagnetic radiation from a viewed scene, and including first and second focal plane arrays that are spatially registered with one another, a first polarizer coupled to the first focal plane array and configured to transmit only a first pair of polarizations to the first focal plane array, and a second polarizer coupled to the second focal plane array and configured to transmit only a second pair of polarizations to the second focal plane array, the second pair of polarizations being different than the first pair of polarizations.

17 Claims, 11 Drawing Sheets

… (US 9,182,283 B2)

IMAGING SPECTROPOLARIMETER USING ORTHOGONAL POLARIZATION PAIRS

BACKGROUND

Imaging spectroscopy is widely used in remote sensing applications. Polarimetry, or measurement of polarized electromagnetic radiation, may also provide useful information about an object, and typically provides at least some different information than is obtained by spectral imaging. In particular, polarimetry is sensitive to the object orientation, composition, and surface roughness, whereas, spectral information is primarily related to material composition. Therefore, in certain applications, it may be desirable to perform both spectral imaging and polarimetry. Generally, this is achieved using two separate instruments, namely, a polarimeter and an imaging spectrometer, although there have been some attempts to combine the two functions into a single instrument.

One type of interferometric spectrometer used to supply spectral data for many remote sensing applications is called a Fourier Transform Spectrometer (FTS). A common form of an FTS employs a Michelson interferometer with one arm having a variable optical path length. The variable optical path length may be implemented using a movable mirror. By scanning the movable mirror over some distance, an interference pattern or interferogram is produced that encodes the spectrum of the source. The FTS uses the Discrete Fourier Transform (DFT) or its faster algorithm, the Fast Fourier Transform (FFT), to convert the auto-correlation (each spectral amplitude encoded as the amplitude of a cosine signal) to physical spectra. The encoded spectrum is the Fourier transform of the source.

Referring to FIG. 1A, there is illustrated a block diagram of one example of an optical configuration of a conventional FTS using a scanning Michelson interferometer implemented with a movable mirror. In this example, the FTS includes two mirrors 105, 110 with a beamsplitter 115 positioned between them. Mirror 105 is a fixed mirror and mirror 110 is a movable mirror. Electromagnetic radiation 120 incident on the beamsplitter 115 from a radiation source (not shown) is divided into two parts, each of which propagates down one of the two arms and is reflected off one of the mirrors. Radiation 120*a* in a first optical path is reflected by the beamsplitter 115 and reflected by the fixed mirror 105. On the return, the radiation 120*a* is again split by the beamsplitter 115, such that 50% of the radiation is reflected back to the input, and the remainder is transmitter through the beamsplitter to a focal plane array 125. Radiation 120*b* in a second optical path is transmitted through the beamsplitter 115, and reflected by the movable mirror 110 which imparts a modulation to the radiation (motion of the mirror 110 is indicated by arrow 130). On the return, the radiation 120*b* is split by the beamsplitter 115 such that 50% of the radiation is transmitted through the beamsplitter back to the input, and the remainder is reflected to the focal plane array 125. The two beams are recombined at the focal plane array 125. When the position of the movable mirror 110 is varied along the axis of the corresponding arm (indicated by arrow 130), an interference pattern, or interferogram, is swept out at the focal plane array 125 as the two phase-shifted beams interfere with each other. If the input electromagnetic radiation 120 is unpolarized, then the focal plane array receives two superimposed, generally non-separable interferograms, one for vertical polarization and one for horizontal polarization.

FIG. 1B illustrates an alternative configuration of an FTS. In this configuration, two focal plane arrays 125*a*, 125*b* are used, and the fixed mirror 105 and moving mirror 110 are oriented such that approximately 50% of the radiation 120*a*, 120*b* from each optical path is directed to each focal plane array. The spectra from each focal plane array 125*a*, 125*b* may be averaged to improve the overall signal-to-noise ratio. This configuration avoids the 50% radiation loss associated with the configuration of FIG. 1A, but is more complex and requires additional components.

Referring to FIG. 1C, an FTS can be converted into a combined spectral imager and polarimeter (spectropolarimeter) by inserting a linear polarizer 210 into the optical path of the incident electromagnetic beam. Thus, polarized electromagnetic radiation 220 is provided to the FTS and analyzed as described above. The linear polarizer 210 may be switchable, such that the polarization of the incident electromagnetic radiation may be changed (e.g., from vertical or horizontal, or vice versa). With this arrangement, different polarizations are input, one at a time, to the FTS. Thus, the FTS measures one interferogram at a time (e.g., for either vertical or horizontal polarization). For the configuration illustrated in FIG. 1C, the focal plane array 125 receives only $1/8^{th}$ of the original, unpolarized input radiation 120 because there is a 50% light loss due to transmission through the beamsplitter 115, as discussed above, and the focal plane array 125 measures one polarization (with half the available signal) for half the total time (assuming both polarization measurements will be made). Thus, this arrangement is very inefficient in terms of photon collection efficiency and is susceptible to errors if the object or scene being measured undergoes changes while the inserted polarizer is switched. If the polarizer is not switched then the instrument only measures information in one polarization. In a system such as that of FIG. 1C, the entire focal plane array 125 measures only one polarization at a time, and different polarizations must be measured sequentially by switching the linear polarizer 210.

Conventional imaging polarimeters (that perform polarimetry alone and are not capable of spectral imaging) use quadrant wire grids positioned over the focal plane array separate the polarizations incident on each pixel of the focal plane array. An example of a quadrant wire grid polarizer 300 is illustrated in FIG. 2. Using a quadrant wire grid polarizer, each pixel of the underlying focal plane array collects only one of four polarizations (0° polarization, 45° polarization, 90° polarization, or 135° polarization), and the three other polarizations for each pixel are created by interpolation. The sensor blur function is matched to each quadrant, and data is interpolated between like polarizations to produce four independent images (one for each polarization). However, as may be seen with reference to FIG. 2, with this arrangement, the distance between like polarizations is too great to enable perfect interpolation. In addition, signal leakage occurs between pixels which further degrade the image quality.

SUMMARY OF THE INVENTION

Aspects and embodiments are directed to a high extinction spectropolarimeter capable of providing simultaneous measurements of orthogonal polarization pairs. Additionally, as discussed in more detail below, the polarimetry function is implemented "within" the spectrometer, rather than using a polarizing filter placed at the input to the system (as is sometimes done conventionally), thereby avoiding any additional signal loss at the system input.

According to one embodiment, a spectropolarimeter comprises a dual-beam interferometric transform spectrometer configured to receive electromagnetic radiation from a viewed scene, and including first and second focal plane arrays that are spatially registered with one another, a first polarizer coupled to the first focal plane array and configured to transmit only a first pair of polarizations to the first focal plane array, and a second polarizer coupled to the second focal plane array and configured to transmit only a second pair of polarizations to the second focal plane array, the second pair of polarizations being different than the first pair of polarizations.

In one example, the first pair of polarizations includes 0° polarization and 45° polarization, and the second pair of polarizations includes 90° polarization and 135° polarization. In another example, the first pair of polarizations includes 0° polarization and 90° polarization, and the second pair of polarizations includes 45° polarization and 135° polarization. In one example, the first polarizer includes a first wire grid having an alternating pixel pattern, and the second polarizer includes a second wire grid having an alternating pixel pattern. In another example, each of the first and second polarizers has an alternating column pattern. In one example, the alternating column pattern is formed by a wire grid. In another example, the alternating column pattern is formed with a birefringent optical material. In another example, the first and second polarizers have the same alternating column pattern, and wherein the first and second polarizers are orthogonally oriented with respect to incident electromagnetic radiation from the viewed scene.

In one example, the first focal plane array includes a first array of pixels including a first plurality of pixels that receive and measure a first polarization of the first pair of polarizations, and a second plurality of pixels that receive and measure a second polarization of the first pair of polarizations, wherein the first focal plane array is configured to, at each of the first plurality of pixels interpolate measurements of the second polarization from adjacent ones of the second plurality of pixels to provide an estimate of the second polarization, and at each of the second plurality of pixels interpolate measurements of the first polarization from adjacent ones of the first plurality of pixels to provide an estimate of the first polarization. The second focal plane array includes a second array of pixels including a third plurality of pixels that receive and measure a third polarization of the second pair of polarizations, and a fourth plurality of pixels that receive and measure a fourth polarization of the second pair of polarizations, wherein the second focal plane array is configured to, at each of the third plurality of pixels interpolate measurements of the fourth polarization from adjacent ones of the fourth plurality of pixels to provide an estimate of the fourth polarization, and at each of the fourth plurality of pixels interpolate measurements of the third polarization from adjacent ones of the third plurality of pixels to provide an estimate of the third polarization, such that the spectropolarimeter is configured for simultaneous collection of four polarizations. In another example, the first focal plane array is configured to convert first and second interferograms received for each of the first and second polarizations, respectively, into first and second spectra corresponding to the first and second polarizations, respectively, and the second focal plane array is configured to convert third and fourth interferograms received for each of the third and fourth polarizations, respectively, into third and fourth spectra corresponding to the third and fourth polarizations, respectively.

In one example of the spectropolarimeter, the dual-beam interferometric transform spectrometer includes a beamsplitter configured to receive and split the electromagnetic radiation into a first arm and a second arm of the dual-beam interferometric transform spectrometer, and to receive, combine, and direct reflected electromagnetic radiation from the first and second arms to the first and second focal plane arrays, a fixed first mirror positioned in the first arm and configured to reflect electromagnetic radiation in the first arm to the beamsplitter, and a movable second mirror positioned in the second arm and configured to reflect electromagnetic radiation in the second arm to the beamsplitter, the second mirror being movable over a scan range to provide an optical path length difference between the first and second arms of the dual-beam interferometric transform spectrometer.

According to another embodiment, a method of spectropolarimetric imaging using a dual-beam interferometric transform spectrometer comprises receiving electromagnetic radiation from a scene with the dual-beam interferometric transform spectrometer, providing a first pair of polarizations of the electromagnetic radiation to a first focal plane array of the dual-beam interferometric transform spectrometer, providing a second pair of polarizations of the electromagnetic radiation to the second focal plane array of the dual-beam interferometric transform spectrometer, the second focal plane array being spatially registered with the first focal plane array, and the second pair of polarizations being different from the first pair of polarizations, with the first focal plane array, producing two images of the scene from the first pair of polarizations, and with the second focal plane array, producing two additional images of the scene from the second pair of polarizations.

In one example, providing the first pair of polarizations to the first focal plane array includes providing 0° polarization and 90° polarization, and wherein providing the second pair of polarizations to the second focal plane array includes providing 45° polarization and 135° polarization. In another example, providing the first pair of polarizations to the first focal plane array includes providing 0° polarization and 45° polarization, and wherein providing the second pair of polarizations to the second focal plane array includes providing 90° polarization and 135° polarization.

In one example, the first focal plane array comprises an array of pixels including a first plurality of pixels that receive a first polarization of the first pair of polarizations, and a second plurality of pixels that receive a second polarization of the first pair of polarizations, the first and second plurality of pixels arranged in an alternating pattern over the array of pixels. In such an example, producing the two images of the scene may include measuring the first polarization using the first plurality of pixels to provide a measurement of the first polarization, measuring the second polarization using the second plurality of pixels to provide a measurement of the second polarization, for each of the first plurality of pixels, interpolating data from adjacent ones of the second plurality of pixels to provide an estimate of the second polarization, for each of the second plurality of pixels, interpolating data from adjacent ones of the first plurality of pixels to provide an estimate of the first polarization, producing a first image of the two images of the scene, corresponding to the first polarization, from the measurement of the first polarization and the estimate of the first polarization, and producing a second image of the two images of the scene, corresponding to the second polarization, from the measurement of the second polarization and the estimate of the second polarization.

According to another embodiment, an interferometric transform spectropolarimeter comprises a first focal plane array comprising a two-dimensional array of pixels, a first quadrant polarizer coupled to the first focal plane array, the first quadrant polarizer having a pixel structure aligned with the two-dimensional array of pixels of the first focal plane array, a beamsplitter configured to receive and split incident electromagnetic radiation from a viewed scene into a first arm and a second arm of the interferometric transform spectropolarimeter, and to receive, combine, and direct reflected electromagnetic radiation from the first and second arms to the first focal plane array, a fixed first mirror positioned in the first arm and configured to reflect electromagnetic radiation in the first arm to the beamsplitter, and a movable second mirror positioned in the second arm and configured to reflect electromagnetic radiation in the second arm to the beamsplitter, the second mirror being movable over a scan range to provide an optical path length difference between the first and second arms of the interferometric transform spectropolarimeter so as to produce an interferogram at the first focal plane array.

In one example, the interferometric transform spectropolarimeter further comprises a second focal plane array comprising a two-dimensional array of pixels, and a second quadrant polarizer coupled to the second focal plane array, the second quadrant polarizer having a pixel structure aligned with the two-dimensional array of pixels of the second focal plane array, wherein the beamsplitter is further configured to receive, combine, and direct reflected electromagnetic radiation from the first and second arms to the second focal plane array.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures.

DETAILED DESCRIPTION

Figure 2:
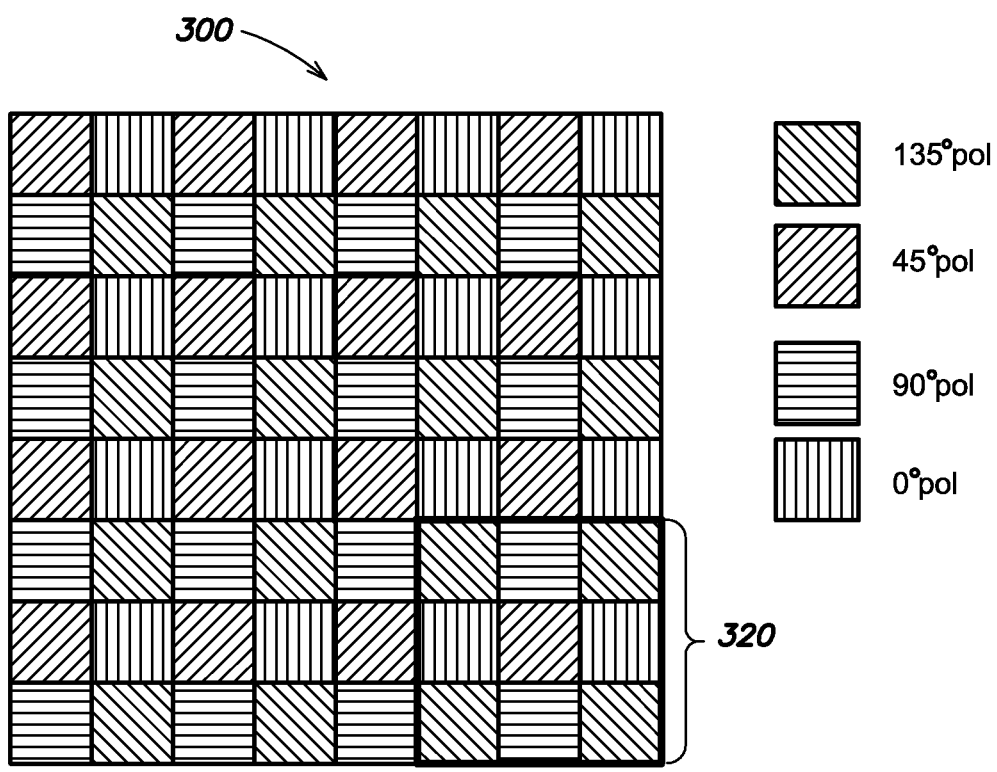
FIG. 2 is a block diagram of one example of a conventional quadrant wire grid polarizer.

A sensor combining imaging spectrometry and polarimetry may provide powerful dual (orthogonal) phenomenologies to detect targets and reduce or eliminate false alarms. However, conventional spectropolarimeters suffer from issues with sensitivity and simultaneity when dividing the incoming signal into different wavebands and polarizations. As discussed above, conventional spectropolarimeters have low efficiency as there are very few photons per spectral channel per polarization, which can result in focal plane noise dominating the overall signal to noise ratio of retrieved spectra. For example, a system such as that illustrated in FIG. 2 loses 50% of the input signal even when performing spectral imaging alone, and when modified to collect spectra and polarization data simultaneously (with the insertion of the polarizer 210 in the input optical train) loses 75% of the signal at any time. Additionally, conventional spectropolarimeters measure different polarizations sequentially or using separate focal plane arrays, which leads to spatial registration problems between the images measured in different polarizations. Although the arrangement illustrated in FIG. 2 provides a simple way to collect both spectral and polarization data, the system is very inefficient and cannot collect polarizations simultaneously.

Figure 3:
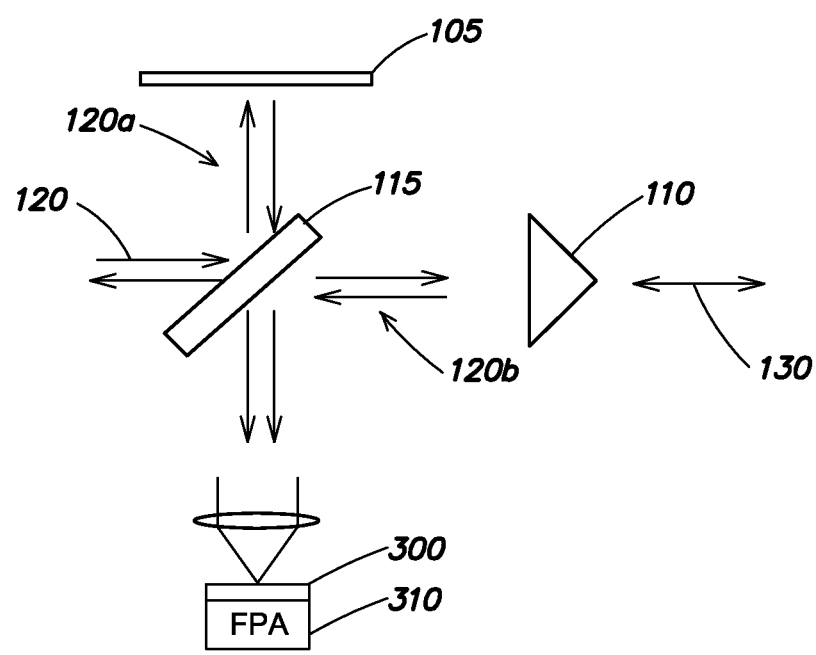
FIG. 3 is a block diagram of one example of an imaging spectropolarimeter according to aspects of the invention.

Aspects and embodiments are directed to an imaging spectropolarimeter that addresses at least some of the disadvantages associated with conventional spectropolarimeters. In particular, according to certain aspects, the polarimetry function is incorporated within the spectrometer, rather than being implemented using an external linear polarizer, such as shown in FIG. 1C. For example, referring to FIG. 3, in one embodiment, a single beam imaging spectropolarimeter (having a configuration similar to that shown in FIG. 1A) may include a quadrant wire grid polarizer 300 associated (or integrated) with the focal plane array 310. In such a configuration, 50% of the input signal 120 may be lost (as discussed above with reference to FIG. 1A). However, all four polarizations may be collected on the FPA 310, as discussed above with reference to FIG. 2, rather than performing spectral imaging of only one polarization at a time, as is the case with the configuration of FIG. 1C.

Figure 1A:
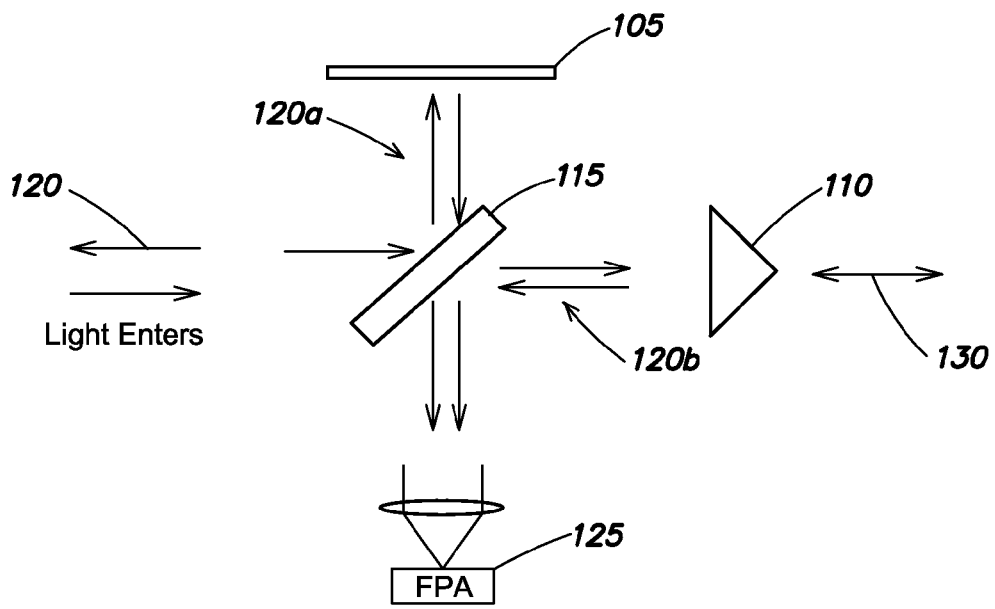
FIG. 1A is a block diagram of one example of a conventional interferometric spectrometer.
Figure 1B:
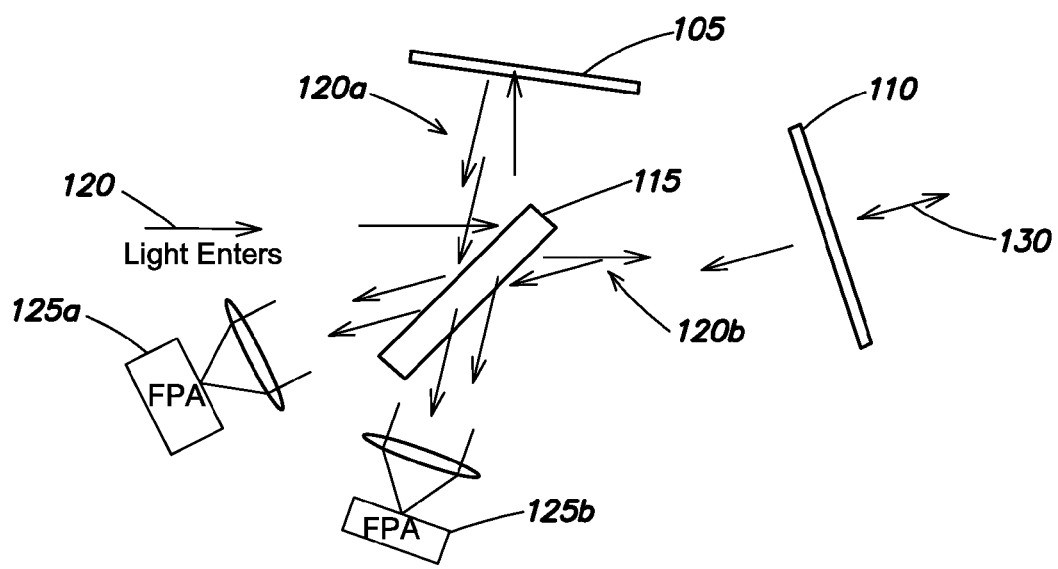
FIG. 1B is a block diagram of another example of a conventional interferometric spectrometer.
Figure 1C:
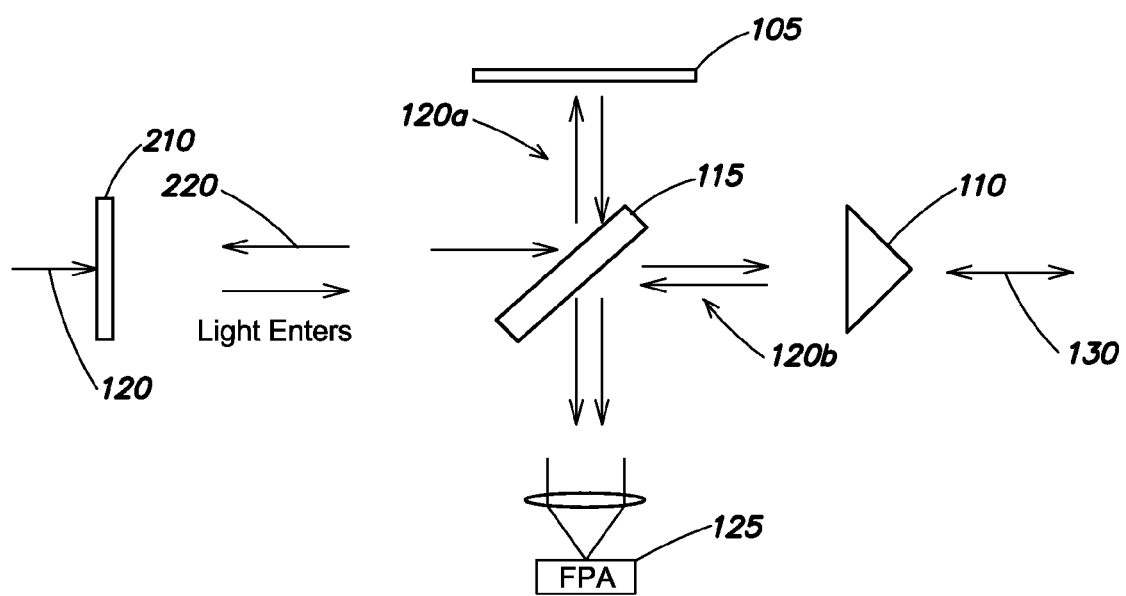
FIG. 1C is a block diagram of one example of an imaging transform spectrometer including a polarizer inserted in the input optical train.

Additionally, certain embodiments employ a dual beam imaging transform spectrometer (ITS) configuration in which beams of electromagnetic radiation are transmitted to two spatially registered focal plane arrays, thereby avoiding the light loss associated with the conventional configurations of FIGS. 1A and 1C. As discussed in more detail below, unique polarizations are collected on each of the two spatially registered focal plane arrays such that two polarizations are collected for every instantaneous field of view (IFOV). In certain embodiments, two orthogonal polarizations are collected on each of the two focal plane arrays, thereby providing higher extinction and less error in interpolating the data to produce an image of each polarization per focal plane array, as discussed further below. The time series of data per pixel per polarization are converted to spectra using FFT processing or alternative processing techniques, as disclosed for example, in commonly-owned U.S. Pat. No. 8,203,715, which is herein incorporated by reference in its entirety.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

Figure 4:
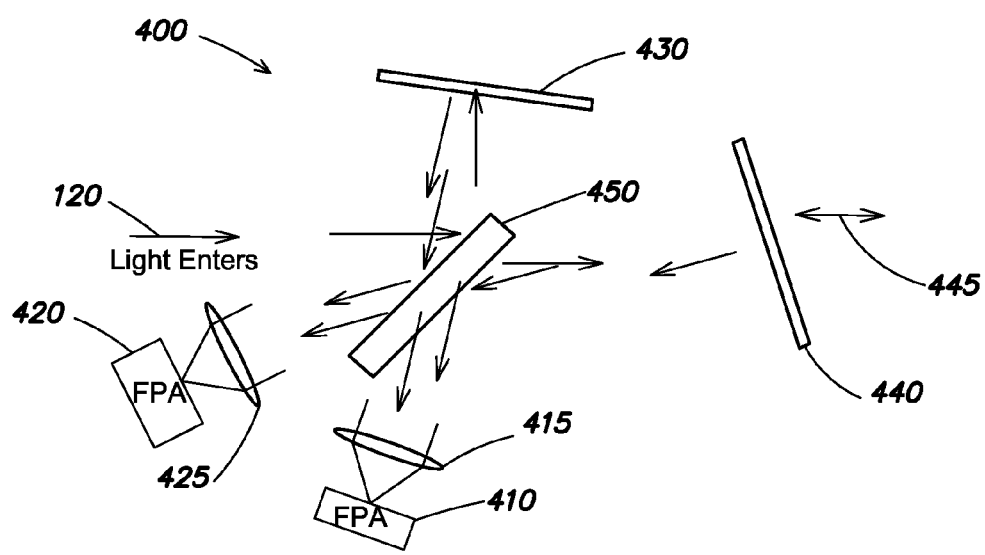
FIG. 4 is a block diagram of one example of an imaging spectropolarimeter according to aspects of the invention.

Referring to FIG. 4, there is illustrated one example of an imaging spectropolarimeter 400 according to certain embodiments. The spectropolarimeter 400 is based on a dual-beam ITS, with two focal plane arrays 410, 420 each including pixelated polarizers, as discussed further below. The ITS uses a scanning Michelson interferometer implemented with a fixed mirror 430, a movable mirror 440, and a beamsplitter 450 positioned between the two mirrors. The beamsplitter 450 is an optical element configured to allow part of an electromagnetic wave to pass through while reflecting the other part. As discussed above, unpolarized or randomly polarized electromagnetic radiation 120 incident on the beamsplitter 450 is divided into two beams, each of which propagates down one of the two arms of the Michelson interferometer and is reflected off one of the mirrors 430, 440. The fixed mirror 430, movable mirror 440, and beamsplitter 450 are oriented such that approximately 50% of the electromagnetic radiation from each arm of the Michelson interferometer is directed to and recombined at each focal plane array 410, 420. The movable mirror 440 imparts a modulation to the beam of electromagnetic radiation in the corresponding path of the Michelson interferometer. In one example, lateral movement of the movable mirror 440 along the axis of the corresponding arm, as shown by arrow 445, produces an optical path length difference between the two arms of the interferometer. The movable mirror 440 scans over a range of movement along the axis indicated by arrow 445, from an initial position to a furthest lateral extent, and back. As the position of the movable mirror 440 is varied along the axis of the arm (indicated by arrow 445), an interferogram is swept out at each of the focal plane arrays 410, 420 as the two phase-shifted beams interfere with each other. The movable mirror 440 may be a plane mirror, a corner cube, or another reflecting device. Optics 415 and 425 focus the beams of electromagnetic radiation onto the focal plane arrays 410 and 420, respectively.

Each of the two focal plane arrays 410, 420 includes a set of photo-detector elements and corresponding electronics arranged at or near the focus of the interferogram. In one example, the set of photo-detectors elements are arranged in a two-dimensional matrix to provide a two-dimensional array of pixels. As discussed above, each of the two focal plane arrays 410, 420 includes or is coupled to an associated polarizer configured to allow each of the focal plane arrays to receive two polarizations. In one example, the polarizers are microgrid arrays aligned with the pixels of the respective focal plane arrays 410, 420.

FIGS. 5A-D illustrate examples of microgrid array polarizers 510, 520, 530, and 540 that may be associated with the focal plane arrays 410 and 420. Each of the polarizers 510, 520, 530, and 540 includes a pattern of alternating "pixels" of two different polarizations. In one embodiment, the polarizer 510 is associated with focal plane array 410, and polarizer 520 is associated with focal plane array 420 (or vice versa). The data collected in each respective polarization on each respective focal plane array is interpolated to provide an estimate of the polarized energy on each pixel of the receiving focal plane array. In this arrangement, each pixel of each focal plane array 410, 420 collects two polarizations simultaneously, there being one direct measurement and one interpolated measurement for each pixel. Each pixel of each focal plane array 410, 420 measures a unique interferogram, and the signals from each focal plane array are converted into spectra for the respective polarizations received including the interpolated measurements. Thus two interferograms, each corresponding to energy in one polarization, are measured at each pixel. As discussed above, the two focal plane arrays 410, 420 are spatially registered with one another. As used herein, the term "spatially registered" in intended to mean that there is a 1:1 correspondence of pixels on the respective focal planes that view the same portion of a scene. Thus, the system may measure all four polarizations from any given location in the scene simultaneously and instantaneously. In this embodiment, each focal plane array 410, 420 measures two polarizations that are separated by 45° (e.g., 0° and 45° for polarizer 510 associated with focal plane array 410), and the orthogonal pairs are measured by the other focal plane array (e.g., 90° and 135° for polarizer 520 associated with focal plane array 420). In one example, it is preferable that the two polarizations measured by each focal plane array 410, 420 are separated by 45° in order to achieve minimum leakage of other polarized energy between adjacent pixels of the array. However, in other embodiments, other arrangements may be used.

For example, according to another embodiment, polarizer 530 may be associated with focal plane array 410 and polarizer 540 may be associated with focal plane array 420 (or vice versa). In this arrangement, each focal plane array 410, 420 again collects two polarizations, however, the two polarizations are orthogonal pairs, separated from one another by 90° instead of 45°. The remaining two polarizations are collected by the other focal plane array. For example, focal plane array 410 with associated polarizer 530 may collect and measure the 0° and 90° polarizations, while focal plane array 420 with associated polarizer 540 may collect and measure the 45° and 135° polarizations. Thus, the system again may measure all four polarizations simultaneously and instantaneously.

As noted above, in these embodiments, each polarizer 510, 520, 530, and 540 is configured to pass two polarizations. This configuration is in contrast to the conventional quadrant wire grid polarizer 300 which has a pattern corresponding to all four polarizations. As discussed above, there are several disadvantages associated with conventional quadrant wire grid polarizers 300, including low extinction, leakage of unwanted polarizations between pixels, and the requirement of extensive and imperfect interpolation to recover all the polarization measurements due to the significant spacing between pixels configured for like polarizations. In particular, referring again to FIG. 2, using a quadrant polarizer requires interpolation of four widely spaced measurements of, at best, four out of every nine pixels 320 to create the interpolation that estimates the received polarization at each pixel, and each estimate is contaminated by energy from three other polarizations. Additionally, there are manufacturing challenges associated with the quadrant wire grid pattern.

Figure 5A:
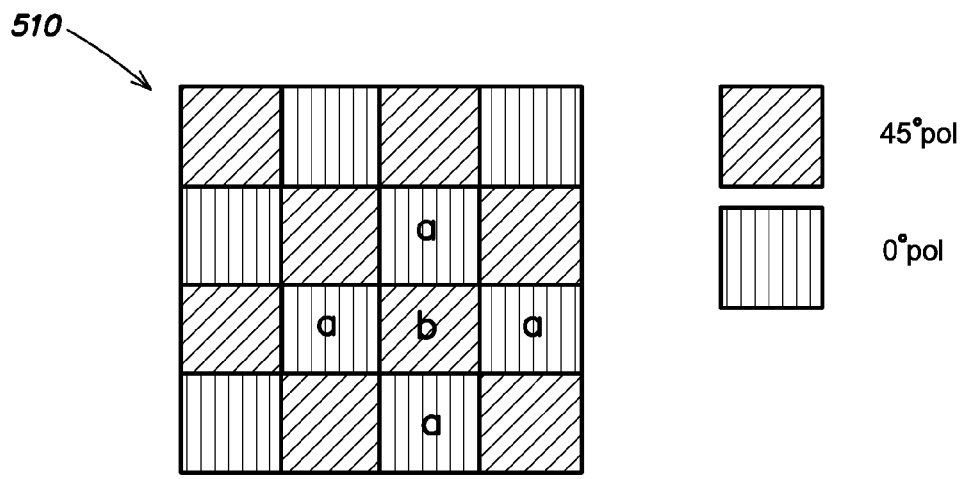
FIGS. 5A-D are block diagrams of various examples of dual-polarization microgrid array polarizers according to aspects of the invention.
Figure 5B:
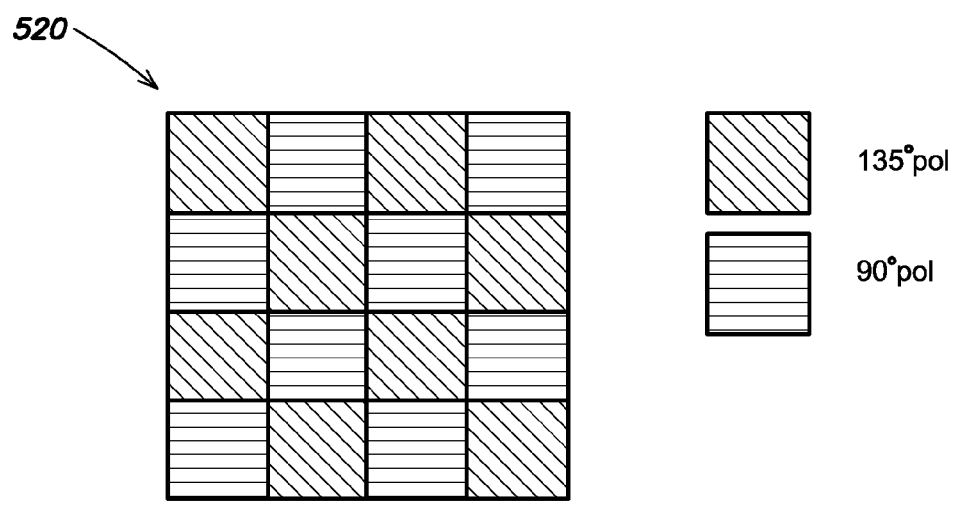
Figure 5C:
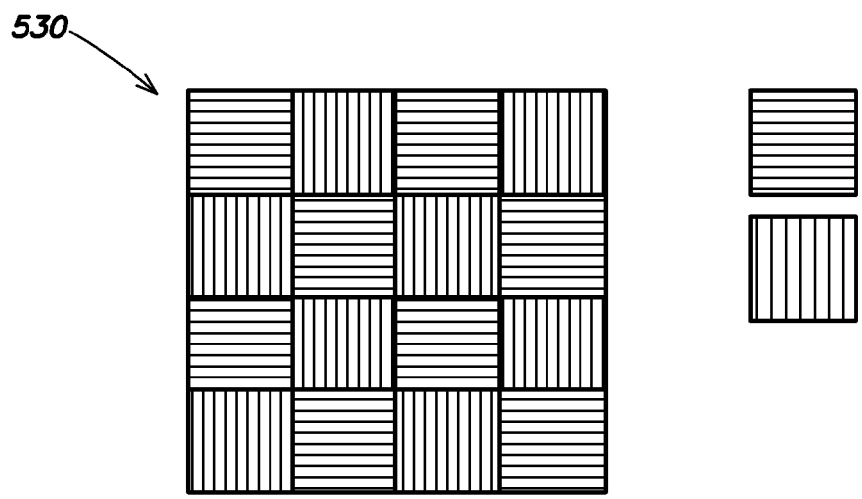
Figure 5D:
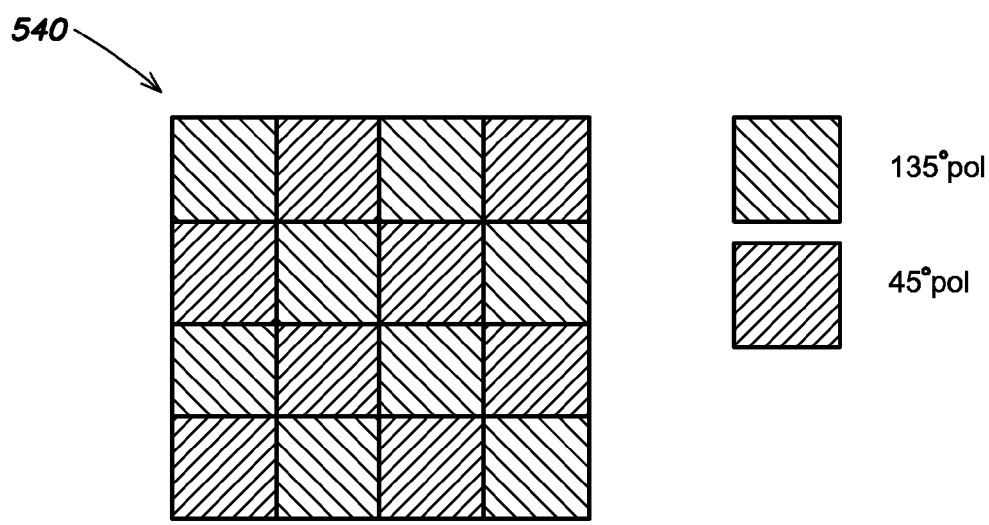
Figure 6A:
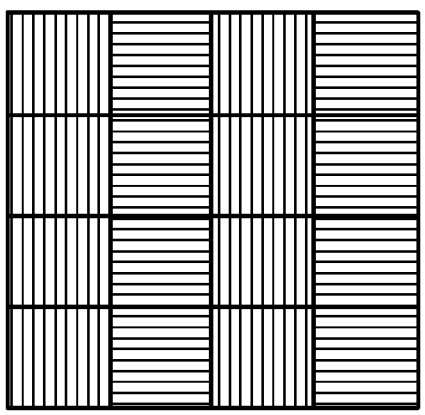
FIGS. 6A-D are block diagrams of various examples of dual-polarization microgrid array polarizers according to aspects of the invention.
Figure 6A:
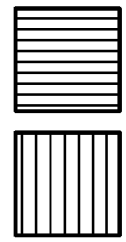
Figure 6B:
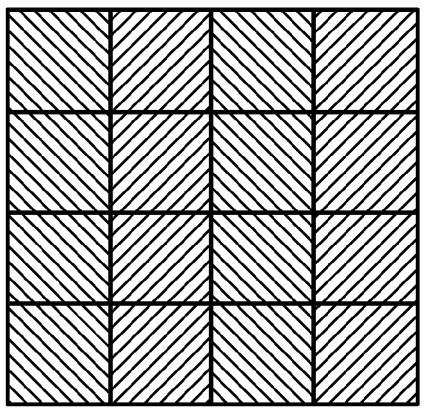
Figure 6B:
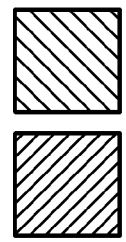
Figure 6C:
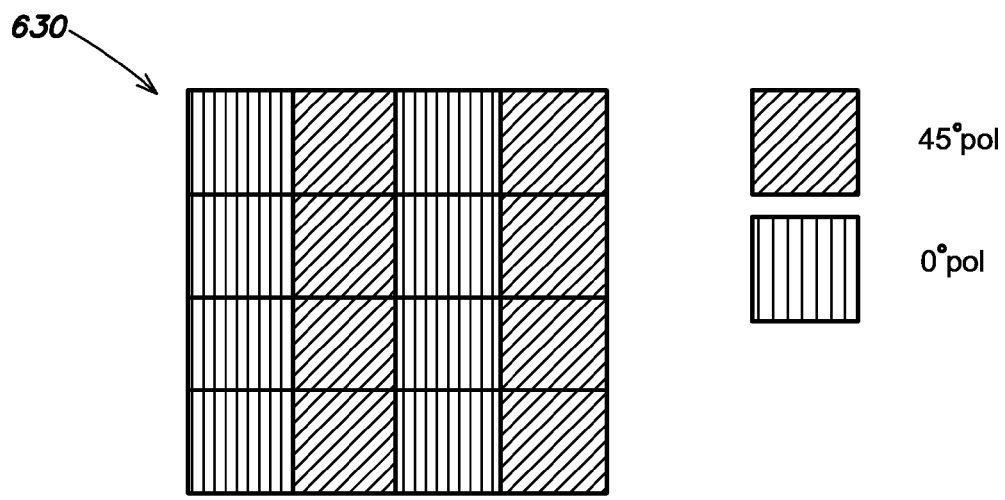
Figure 6D:
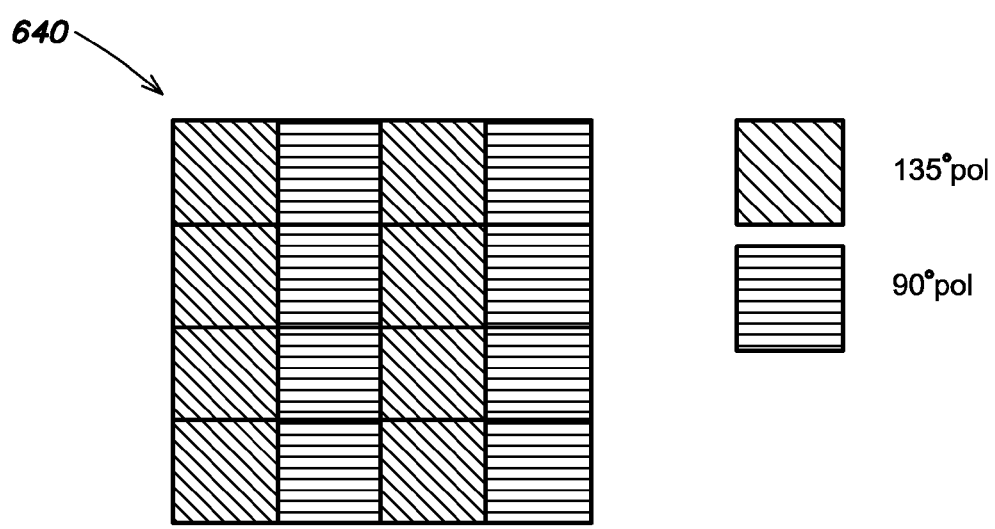

By using a polarizer patterned for only two polarizations, instead of four, according to aspects of the present invention, many of the disadvantages associated with conventional quadrant wire grid polarizers 300 may be mitigated or avoided. As discussed above, the two focal plane arrays 410, 420 may be mechanically aligned at the pixel level such that a blur function spanning a 2×2 pixel grid is incident on all four polarizations (two per focal plane array). Data may be interpolated on each focal plane array 410, 420 using the four surrounding opposite polarizations to produce two independent polarization images on each frame per focal plane array. Thus, as shown in FIG. 5A, for example, a dual polarizer interpolates four out of every five closely spaced pixels (e.g., pixels "a") to create each estimate of received polarization at a given pixel (e.g., pixel "b"). This estimate may have much greater accuracy than the estimates produced using a conventional quadrant polarizer, and as much as 10× less leakage of unwanted polarizations. Spectra are computed using a time series of data at each pixel per polarization.

Unlike the conventional quadrant wire grid polarizer 300, where three interpolations per pixel must be made (to obtain data on all four polarizations), and at best only two pixels of any other polarization are adjacent any given pixel, in the arrangements of FIGS. 5A-D, only one interpolation is needed per pixel per focal plane array, and each pixel (except those on the edges of the focal plane array) is surrounded by four pixels of the opposite polarization. Therefore, the interpolation, and resulting estimate of the polarization measurement per pixel may be significantly improved. This arrangement also results in less leakage between pixels because each pixel is adjacent to fewer non-detecting pixels (non-detecting meaning not detecting the same polarization) than in the conventional quadrant arrangement. Thus, the direct measurements per pixel may be improved relative to the conventional arrangement illustrated in FIG. 3, and the estimates (for each pixel) of the other polarization may also be improved. The extinction ratios for the arrangements of FIGS. 5A-D may exceed 20.

The example polarizers illustrated in FIGS. 5A-D each has an alternating pixel pattern. According to another embodiment, the polarizers may be configured such that each column (or row) has a single polarization, as illustrated in FIGS. 6A-D. Again, the two polarizations passed by each polarizer 610, 620, 630, and 640 (and therefore collected and measured by the underlying focal plane array) may be separated by 90° (polarizers 610 and 620) or 45° (polarizers 630 and 640). Polarizers 610 and 620 may be used together with the two focal plane arrays 410 and 420, or polarizers 630 and 640 may be used together with the two focal plane arrays, such that together the two focal plane arrays collect and measure all four polarizations. Data are interpolated between each pair of like polarizations to produce two individual polarization images in each frame per focal plane array. Thus, considering the two focal plane arrays 410 and 420 together, each instantaneous field of view collects two polarizations (one per focal plane array), and the other polarization for that instantaneous field of view is created by interpolation. Therefore, the system may measure all four polarizations simultaneously and instantaneously. The column (or row) based arrangement may be easier to manufacture than the alternating pixel arrangements of FIGS. 5A-D, and may provide extinction ratios in excess of 30. Additionally, these column (or row) based arrangements may allow the use of optical materials, such as dielectric coatings or birefringent materials, to produce the pattern, rather than wire grids, for example.

Figure 7:
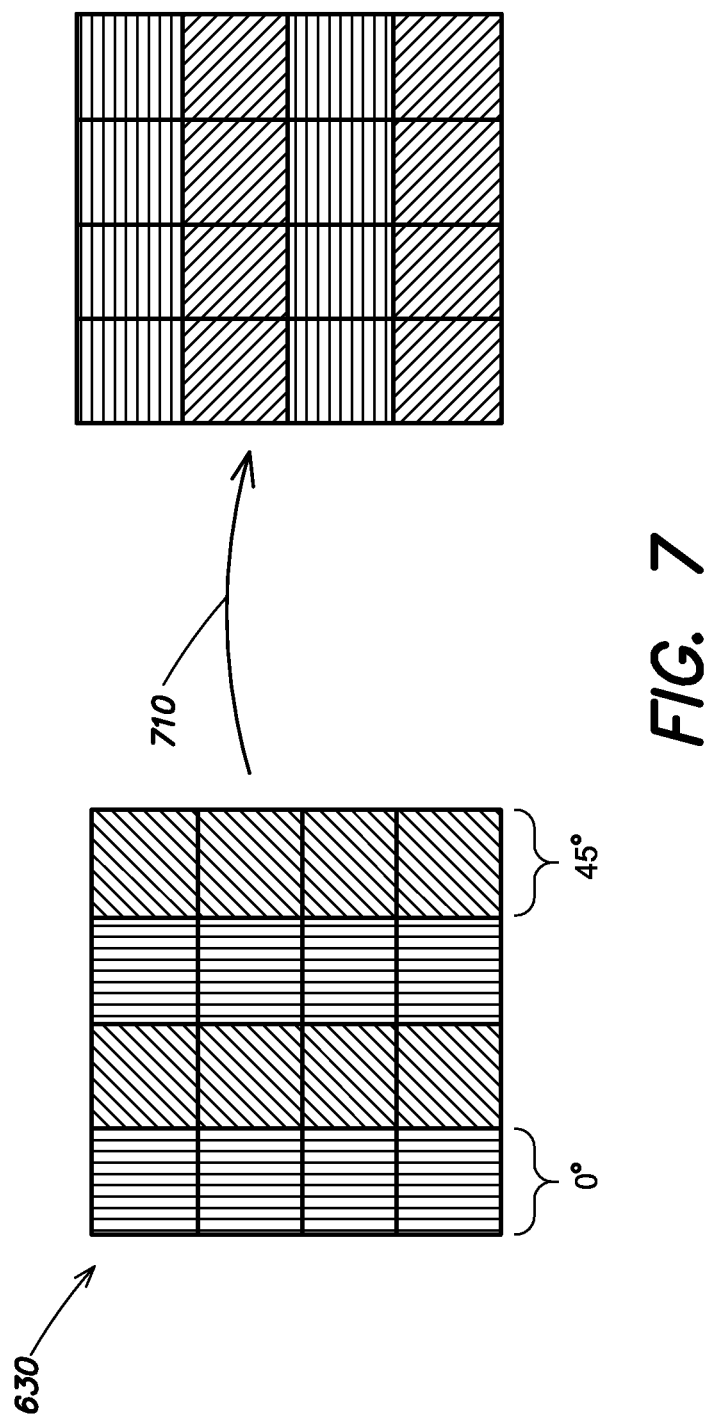
FIG. 7 is a block diagram illustrating an example of a polarizer configuration for use in embodiments of the spectropolarimeter of FIG. 4, according to aspects of the invention.

According to another embodiment, the system 400 may be arranged such that two polarizers with the exact same arrangement may be used with the two focal plane arrays 410, 420 to capture all four polarizations, rather than two differently-patterned polarizers. For example, referring to FIG. 7, a polarizer 630 associated with one focal plane array 410 or 420, and having an alternating column pattern for 0° and 90° polarizations, may be rotated 90°, as indicated by arrow 710, and placed on the focal plane array 420 or 410, respectively, thereby providing alternating rows of the other two polarizations (45° and 135° in the illustrated example). This arrangement provides the advantage of requiring only a single type of polarizer to be manufactured. In another embodiment, a square focal plane array may be manufactured with an integrated wire grid patterned in alternating rows or columns for two polarizations (similar to the arrangement shown in FIGS. 6A-D). The system 400 may then include two such focal plane arrays, with one array rotated 90° relative to the other.

Figure 8:
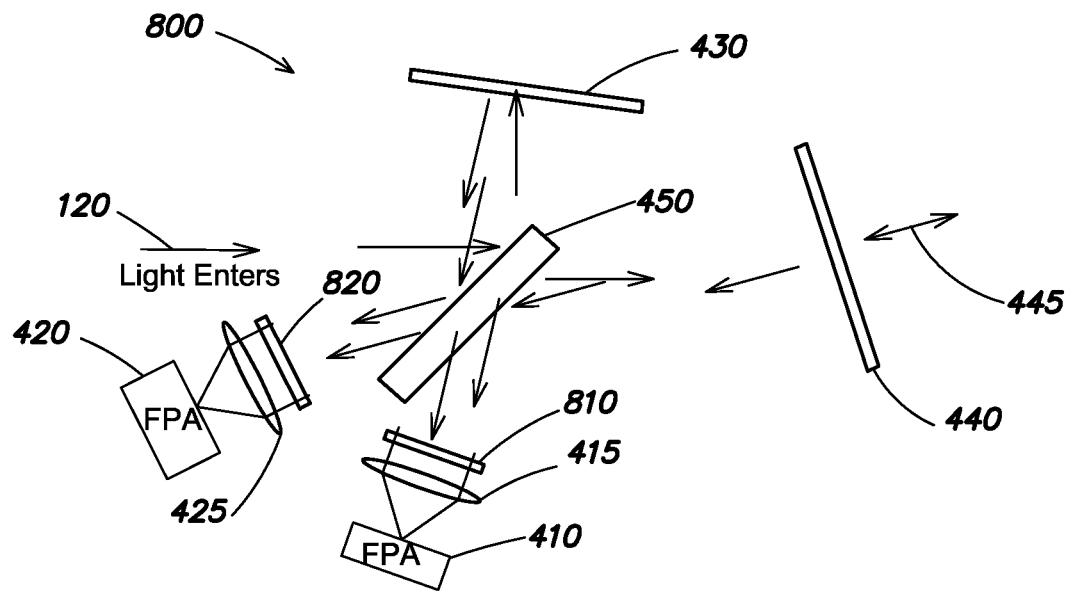
FIG. 8 is a block diagram of another example of a spectropolarimeter, according to aspects of the invention.

In the embodiments discussed above, the polarizers associated with each of the focal plane arrays 410 and 420 are pixel or column/row based arrays configured to pass two of the collecting all four polarizations at any time. According to another embodiment, a spectropolarimeter may be configured with fixed or variable polarizers collecting two polarization measurements at any time. The collected pair of polarizations may be orthogonal, but need not be. Referring to FIG. 8, there is illustrated a block diagram of one example of a spectropolarimeter including a first polarizer 810 associated with the first focal plane array and a second polarizer 820 associated with the second focal plane array 420. In one example, the first polarizer 810 is a horizontal linear polarizer, and the second polarizer 820 is a vertical linear polarizer (or vice versa). In another example, the system 800 may be configured to collect two of three independent polarizations, namely 0°, 60°, and 120°. For example, the first polarizer 810 may configured to pass one of 0° or 60° polarization, and the second polarizer 820 may configured to pass the other of 0° or 60° polarization. In this example, one of the two polarizers 810 or 820 may be switchable to allow one of the focal plane arrays to collect the 120° polarization, as needed. In yet another configuration both polarizers are quadrant polarizers passing 0°, 45°, 90°, and 135° polarizations, respectively.

Figure 9:
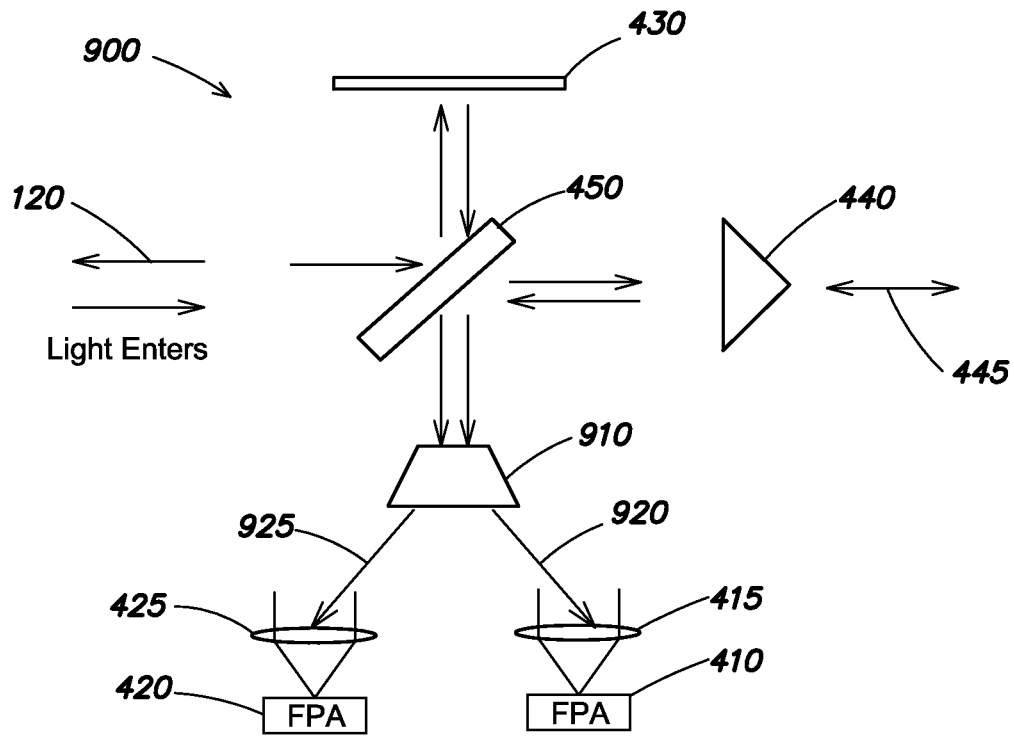
FIG. 9 is a block diagram of another example of a spectropolarimeter, according to aspects of the invention.

Referring to FIG. 9, there is illustrated a block diagram of another embodiment of a spectropolarimeter 900 configured to collect an orthogonal polarization pair. In this embodiment, the spectropolarimeter 900 includes an achromatic polarizing beamsplitter 910 that splits the electromagnetic radiation returned from the Michelson interferometer via the beamsplitter 450 into two orthogonal polarizations, namely a first polarization 920 and a second, orthogonal polarization 925. The first focal plane array 410 receives the first polarization 920, and the second focal plane array 420 receives the second, orthogonal polarization 925. Thus, both polarizations may be collected simultaneously, as discussed above. In one example, the achromatic polarizing beamsplitter 910 is configured to separate vertical and horizontal polarizations, such that the first polarization 920 is horizontal polarization, and the second polarization 925 is vertical polarization, or vice versa.

Thus, aspects and embodiments provide a high extinction imaging spectropolarimeter. Two polarizations may be measured simultaneously for each scene pixel with high fidelity interpolation available for the other two polarizations, as discussed above. In one example, orthogonal polarization pairs are collected on alternate pixels in a dual-beam ITS configuration. In another example, orthogonal polarization pairs are collected on alternate columns or rows in a dual-beam ITS configuration. In the dual-beam ITS configuration, the two focal plane arrays are spatially registered, and unique polarizations are collected on each focal plane array, such that two true polarizations are collected simultaneously for each instantaneous field of view. The remaining two polarizations for each instantaneous field of view are computed through data interpolation, as discussed above. The use of polarizers that are configured for two polarizations, rather than four, per focal plane array may result in higher extinction and significantly less error in interpolating the data to produce an image in each polarization per focal plane array. As discussed above, aspects and embodiments disclosed herein may be applied to conventional Fourier transform spectrometers, or to other types of imaging spectrometers that use alternative methods (other than classic Fourier analysis) to convert the modulation into spectral information, such as the imaging spectrometer forms disclosed in commonly-owned U.S. Pat. No. 8,203,715, for example. Aspects and embodiments advantageously permit collection of spectropolarimetry using Michelson-type transform spectrometers, optionally with the use of uncooled bolometer focal plane arrays (for infrared measurements).

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. A spectropolarimeter comprising:
   a dual-beam interferometric transform spectrometer configured to receive electromagnetic radiation from a viewed scene, and including first and second focal plane arrays that are spatially registered with one another;
   a first polarizer coupled to the first focal plane array and configured to transmit only a first pair of polarizations to the first focal plane array; and
   a second polarizer coupled to the second focal plane array and configured to transmit only a second pair of polarizations to the second focal plane array, the second pair of polarizations being different than the first pair of polarizations.

2. The spectropolarimeter of claim 1, wherein the first pair of polarizations includes 0° polarization and 45° polarization, and the second pair of polarizations includes 90° polarization and 135° polarization.

3. The spectropolarimeter of claim 1, wherein the first pair of polarizations includes 0° polarization and 90° polarization, and the second pair of polarizations includes 45° polarization and 135° polarization.

4. The spectropolarimeter of any preceding claim, wherein the first polarizer includes a first wire grid having an alternating pixel pattern, and the second polarizer includes a second wire grid having an alternating pixel pattern.

5. The spectropolarimeter of any one of claims 1-3, wherein each of the first and second polarizers has an alternating column pattern.

6. The spectropolarimeter of claim 5, wherein the alternating column pattern is formed by a wire grid.

7. The spectropolarimeter of claim 5, wherein the alternating column pattern is formed with a birefringent optical material.

8. The spectropolarimeter of any one of claims 5-7, wherein the first and second polarizers have the same alternating column pattern, and wherein the first and second polarizers are orthogonally oriented with respect to incident electromagnetic radiation from the viewed scene.

9. The spectropolarimeter of any preceding claim, wherein the first focal plane array includes a first array of pixels including a first plurality of pixels that receive and measure a first polarization of the first pair of polarizations, and a second plurality of pixels that receive and measure a second polarization of the first pair of polarizations, wherein the first focal plane array is configured to, at each of the first plurality of pixels interpolate measurements of the second polarization from adjacent ones of the second plurality of pixels to provide an estimate of the second polarization, and at each of the second plurality of pixels interpolate measurements of the first polarization from adjacent ones of the first plurality of pixels to provide an estimate of the first polarization; and
   wherein the second focal plane array includes a second array of pixels including a third plurality of pixels that receive and measure a third polarization of the second pair of polarizations, and a fourth plurality of pixels that receive and measure a fourth polarization of the second pair of polarizations, wherein the second focal plane array is configured to, at each of the third plurality of pixels interpolate measurements of the fourth polarization from adjacent ones of the fourth plurality of pixels to provide an estimate of the fourth polarization, and at each of the fourth plurality of pixels interpolate measurements of the third polarization from adjacent ones of the third plurality of pixels to provide an estimate of the third polarization, such that the spectropolarimeter is configured for simultaneous collection of four polarizations.

10. The spectropolarimeter of claim 9, wherein the first focal plane array is configured to convert first and second interferograms received for each of the first and second polarizations, respectively, into first and second spectra corresponding to the first and second polarizations, respectively; and
    wherein the second focal plane array is configured to convert third and fourth interferograms received for each of the third and fourth polarizations, respectively, into third and fourth spectra corresponding to the third and fourth polarizations, respectively.

11. The spectropolarimeter of any preceding claim, wherein the dual-beam interferometric transform spectrometer includes:
    a beamsplitter configured to receive and split the electromagnetic radiation into a first arm and a second arm of the dual-beam interferometric transform spectrometer, and to receive, combine, and direct reflected electromagnetic radiation from the first and second arms to the first and second focal plane arrays;
    a fixed first mirror positioned in the first arm and configured to reflect electromagnetic radiation in the first arm to the beamsplitter; and
    a movable second mirror positioned in the second arm and configured to reflect electromagnetic radiation in the second arm to the beamsplitter, the second mirror being movable over a scan range to provide an optical path length difference between the first and second arms of the dual-beam interferometric transform spectrometer.

12. A method of spectropolarimetric imaging using a dual-beam interferometric transform spectrometer, the method comprising:
  receiving electromagnetic radiation from a scene with the dual-beam interferometric transform spectrometer;
  providing a first pair of polarizations of the electromagnetic radiation to a first focal plane array of the dual-beam interferometric transform spectrometer;
  providing a second pair of polarizations of the electromagnetic radiation to the second focal plane array of the dual-beam interferometric transform spectrometer, the second focal plane array being spatially registered with the first focal plane array, and the second pair of polarizations being different from the first pair of polarizations;
  with the first focal plane array, producing two images of the scene from the first pair of polarizations; and
  with the second focal plane array, producing two additional images of the scene from the second pair of polarizations.

13. The method of claim 12, wherein providing the first pair of polarizations to the first focal plane array includes providing 0° polarization and 90° polarization, and wherein providing the second pair of polarizations to the second focal plane array includes providing 45° polarization and 135° polarization.

14. The method of claim 12, wherein providing the first pair of polarizations to the first focal plane array includes providing 0° polarization and 45° polarization, and wherein providing the second pair of polarizations to the second focal plane array includes providing 90° polarization and 135° polarization.

15. The method of any one of claims 12-14, wherein the first focal plane array comprises an array of pixels including a first plurality of pixels that receive a first polarization of the first pair of polarizations, and a second plurality of pixels that receive a second polarization of the first pair of polarizations, the first and second plurality of pixels arranged in an alternating pattern over the array of pixels, and wherein producing the two images of the scene includes:
  measuring the first polarization using the first plurality of pixels to provide a measurement of the first polarization;
  measuring the second polarization using the second plurality of pixels to provide a measurement of the second polarization;
  for each of the first plurality of pixels, interpolating data from adjacent ones of the second plurality of pixels to provide an estimate of the second polarization;
  for each of the second plurality of pixels, interpolating data from adjacent ones of the first plurality of pixels to provide an estimate of the first polarization;
  producing a first image of the two images of the scene, corresponding to the first polarization, from the measurement of the first polarization and the estimate of the first polarization; and
  producing a second image of the two images of the scene, corresponding to the second polarization, from the measurement of the second polarization and the estimate of the second polarization.

16. An interferometric transform spectropolarimeter comprising:
  a first focal plane array comprising a two-dimensional array of pixels;
  a first quadrant polarizer coupled to the first focal plane array, the first quadrant polarizer having a pixel structure aligned with the two-dimensional array of pixels of the first focal plane array;
  a beamsplitter configured to receive and split incident electromagnetic radiation from a viewed scene into a first arm and a second arm of the interferometric transform spectropolarimeter, and to receive, combine, and direct reflected electromagnetic radiation from the first and second arms to the first focal plane array;
  a fixed first mirror positioned in the first arm and configured to reflect electromagnetic radiation in the first arm to the beamsplitter; and
  a movable second mirror positioned in the second arm and configured to reflect electromagnetic radiation in the second arm to the beamsplitter, the second mirror being movable over a scan range to provide an optical path length difference between the first and second arms of the interferometric transform spectropolarimeter so as to produce an interferogram at the first focal plane array.

17. The interferometric transform spectropolarimeter of claim 16, further comprising:
  a second focal plane array comprising a two-dimensional array of pixels; and
  a second quadrant polarizer coupled to the second focal plane array, the second quadrant polarizer having a pixel structure aligned with the two-dimensional array of pixels of the second focal plane array;
  wherein the beamsplitter is further configured to receive, combine, and direct reflected electromagnetic radiation from the first and second arms to the second focal plane array.

* * * * *

UNITED STATES PATENT AND TRADEMARK OFFICE
CERTIFICATE OF CORRECTION

PATENT NO. : 9,182,283 B2
APPLICATION NO. : 14/244251
DATED : November 10, 2015
INVENTOR(S) : Ian S. Robinson et al.

It is certified that error appears in the above-identified patent and that said Letters Patent is hereby corrected as shown below:

In the Specification:

At column 10, line 27, after the word "the", insert --four 0°, 45°, 90°, and 135° polarizations, such that the spectropolarimeter 400 is capable of--.

In the Claims:

At column 11, line 65, claim 5, delete "any one of claims 1-3" and replace with --claim 1--.

At column 12, line 6, claim 8, delete "any one of claims 5-7" and replace with --claim 5--.

At column 12, line 9, claim 9, delete "any preceding claim" and replace with --claim 1--.

At column 12, line 52, claim 11, delete "any preceding claim" and replace with --claim 1--.

At column 13, line 35, claim 15, delete "any one of claims 12-14" and replace with --claim 12--.

Signed and Sealed this
Eighth Day of March, 2016

Michelle K. Lee
*Director of the United States Patent and Trademark Office*